Dec. 25, 1962 E. G. STRICKER 3,069,852
THRUST VECTORING APPARATUS
Filed Oct. 27, 1959

*INVENTOR.*
EDWARD G. STRICKER
BY
ATTORNEY

United States Patent Office 3,069,852
Patented Dec. 25, 1962

3,069,852
THRUST VECTORING APPARATUS
Edward G. Stricker, North Canton, Ohio, assignor to Goodyear Aircraft Corporation, Akron, Ohio, a corporation of Delaware
Filed Oct. 27, 1959, Ser. No. 848,994
2 Claims. (Cl. 60—35.55)

This invention relates to thrust vectoring devices particularly adapted for use on solid fuel rockets or the like.

It is the general object of the invention to provide thrust vectoring apparatus to deflect a gas blast from a nozzle, the apparatus being characterized by absence of friction seals, relatively large clearances to eliminate freeze-ups, reduction of weight and inexpensiveness of construction while maintaining high operative efficiency.

Another object of the invention is to provide a thrust vectoring apparatus of truncated spherical airfoil shape positioned in pivotal relationship with the end of a gas discharge nozzle, and movable from concentric position around the nozzle into a gas deflecting position, the airfoil and nozzle being surrounded by a shroud.

Another object of the invention is the provision of apparatus of the character described in which the operative mechanism for moving the airfoil can be positioned outside of the shroud so that it is separated by the space between the nozzle and shroud from the hot nozzle.

Another object of the invention is the provision of a plurality of thrust vectoring devices of the type set forth in different sectors or quadrants of the aft bulkhead of a solid fuel rocket, and with adjacent thrust vectoring devices having their pivots mounted at an angle to each other so as to control all movements of the rocket including yaw, roll, and pitching.

The foregoing objects of the invention, and other objects which will become apparent as the description proceeds, are achieved by the combination of a rocket, a nozzle secured to the aft end bulkhead of the rocket and extending rearwardly therefrom, a shroud surrounding the nozzle, a hollow spherical valve having diametrically opposed sides removed pivotally mounted between the shroud and the nozzle, the inside of the value having a relatively close rotary fit with the outside of the discharge end of the nozzle, and means for moving the valve from a position substantially concentric with the nozzle to an angular position interfering with and deflecting the flow of gas rearwardly from the nozzle. Usually a plurality of nozzles, each having the associated shroud and valve, are mounted on the rocket bulkhead, each in a different section or quadrant thereof, and the pivotal mountings of adjacent valves being on axes at an angle to each other.

For a better understanding of the invention, reference should be had to the accompanying drawings wherein FIG. 1 is a side elevation of a solid fuel rocket incorporating the thrust vectoring devices of the invention;

Figure 1:
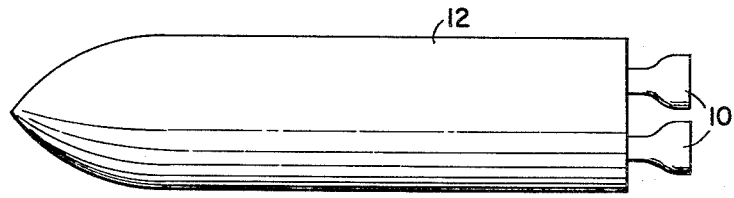
Figure 2:
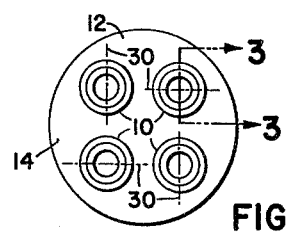
FIG. 2 is an elevational view of the aft end of rocket of FIG. 1.

In the drawings, the numeral 10 indicates generally the improved thrust vectoring apparatus of the invention, a plurality of these being shown in association with a solid fuel rocket 12. As best seen in FIG. 2 of the drawings, the plurality of the thrust vectoring members 10 are preferably mounted in different sectors of the aft end bulkhead 14 of the rocket 12, these being shown as positioned in respective quadrants of the circular bulkhead 14.

Figure 3:
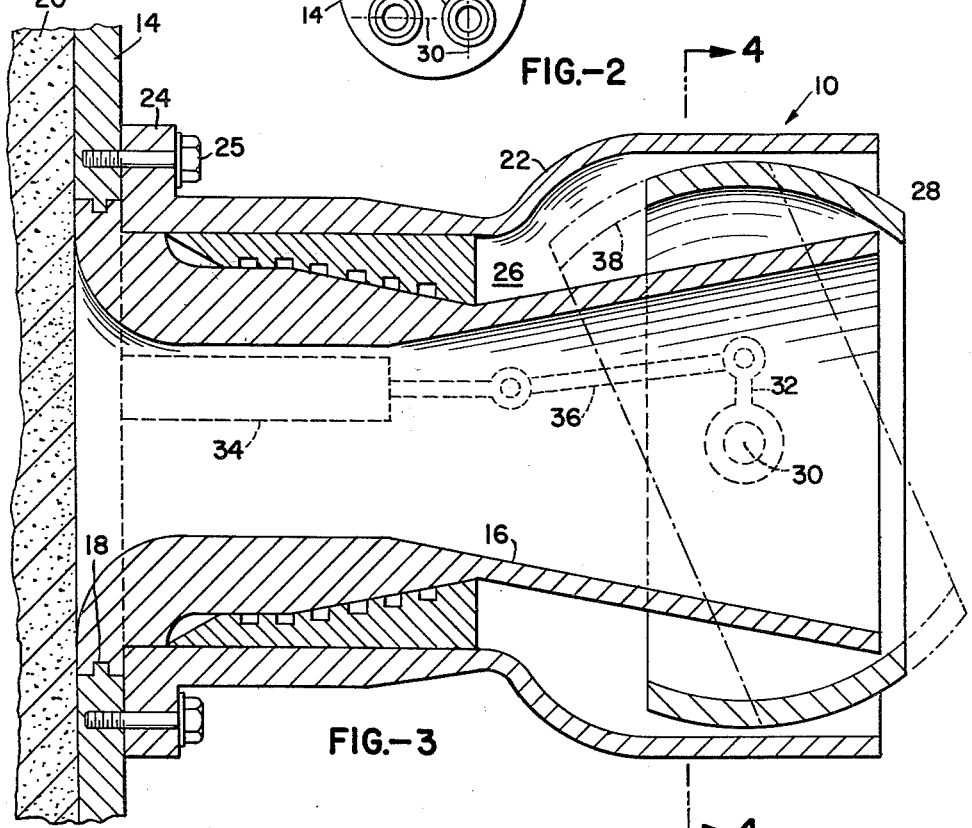
FIG. 3 is an enlarged cross-sectional view of one thrust vectoring device incorporated with the rocket of FIG. 1, and taken substantially on line 3—3 of FIG. 2.
Figure 4:
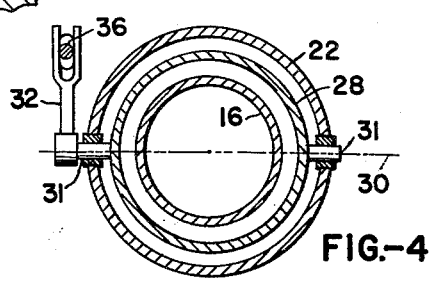
FIG. 4 is a cross-sectional view taken on line 4—4 of FIG. 3, but on reduced scale.

Referring to FIG. 3, each thrust vectoring apparatus 10 includes a nozzle 16 having its small end secured in any suitable fashion in alignment with an opening 18 in the aft end bulkhead 14 of the rocket 12 typically filled with solid fuel 20.

Surrounding the nozzle 16 is a bell-shaped shroud 22 having its smaller end flanged as at 24 and secured by a plurality of screws 25 to the bulkhead 14 so that the shroud 22 surrounds the nozzle 16 in the manner shown to provide a chamber 26 of substantially dead air to heat insulate the nozzle 16 from the outside of the shroud 22. A fibreglass and phenolic heat insulating ring 27 with a plurality of grooves formed therein may likewise be provided between the nozzle 16 and the shroud 22 in the manner shown.

Surrounding the large end of the nozzle 16 in substantially concentric relationship therewith is a hollow spherical valve, sometimes called a jetavator 28, open at diametrically opposed ends, and pivotally mounted on an axis 30 so as to be normally positioned concentric to the large end of the nozzle 16 in the manner shown in solid lines in the drawing. Usually the valve 28 is mounted in trunnion type bearings 31 on the inside of the shroud 22, and with one of the trunnions extending outwardly through the shroud 22 and having a crank 32 attached thereto. An activator, such as a servo motor 34 is mounted on the bulkhead 14 to one side of the shroud 22 and on the outside thereof, and is pivotally connected by a link 36 to the crank 32 so that operation of the servo motor 34 will swing the valve 28 about the axis 30 into a position shown by the chain dotted lines 38 to deflect the gas stream passing out of the nozzle 16 in one direction or the other, thereby controlling the direction of movement of the rocket 12. The manner of controlling the servo motor 34 forms no part of the present invention.

An important feature of the invention is that no friction seals of any kind are required between the valve 28 and the nozzle 16 in order to contain reverse gas flow upon valve deflection. Thus, the apparatus as illustrated and described functions satisfactorily with a clearance, as illustrated, between the valve 28 and nozzle 16 to thereby eliminate binding or freeze-ups resulting from aluminized propellant depositions and/or thermogradients which may induce an out of roundness in the nozzle or the valve. Accordingly, the requirements of the servo motor 34 are reduced by eliminating the weight and friction penalties imposed by designs in which reverse flow seals are used. Moreover, the use of the shroud 22 around the nozzle 16 and the valve 28 provides a substantially dead air space shielding off heat from the servo motor 34 or other operating or control equipment placed outside of the shroud 10.

While a certain representative embodiment and details have been shown for the purpose of illustrating the invention, it will be apparent to those skilled in this art that various changes and modifications may be made therein without departing from the spirit or scope of the invention.

What is claimed is:

1. The combination of rocket having an aft end bulkhead, a plurality of parallel nozzles secured to said aft end bulkhead and extending rearwardly therefrom to direct separate and independent fluid streams from the rear of the rocket, a shroud surrounding each nozzle and being of substantially equal length therewith, removable means securing the shroud to said aft end bulkhead, a hollow spherical valve having diametrically opposed sides removed and an inside spherical surface in close rotary fit with the outside of the discharge end of the nozzle, means pivotally mounting the valve on the shroud on an axis transverse to the longitudinal axis of the nozzle, whereby the valve and shroud can be removed as a unit from around the nozzle, and means for moving each valve from a position concentric with the nozzle to an angular position interfering with and deflecting the flow of fluid rearwardly from each nozzle.

2. The combination of a rocket having an aft end bulkhead, a plurality of parallel and equally spaced nozzles secured to the aft end bulkhead of the rocket and extending rearwardly therefrom, each nozzle being separate from every other and being positioned in a different arcuate sector of the bulkhead, said nozzles being of equal configuration to produce equal thrusts, a shroud surrounding each nozzle, a hollow spherical valve having diametrically opposed sides removed and an inside spherical surface in relatively close rotary fit with the outside of the discharge end of the nozzle, means pivotally mounting the valve on the shroud on an axis transverse the longitudinal axis of the nozzle, and means for moving each valve from a position concentric with the nozzle to an angular position interfering with and deflecting the flow of gas rearwardly from each nozzle, the pivotal mounting of every other valve being parallel to but offset from each other, and the pivotal mountings of the valves adjacent to each other being at right angles to each other.

References Cited in the file of this patent

UNITED STATES PATENTS

| 2,664,700 | Benoit | Jan. 5, 1954 |
| 2,780,059 | Fiedler | Feb. 5, 1957 |
| 2,928,238 | Hawkins | Mar. 15, 1960 |

FOREIGN PATENTS

| 1,022,847 | Germany | Jan. 18, 1958 |
| 697,721 | Great Britain | Sept. 30, 1953 |
| 727,255 | Great Britain | Mar. 30, 1955 |

OTHER REFERENCES

Chandler: "Anti-Bomber Rocket Missles," Aero Digest Magazine, vol. 60, No. 4, pages 100–101, April, 1950.

Rocket Encyclopedia Illustrated, page 204, Aero Publishers Inc., Los Angeles 26, Calif., published April 28, 1959.